United States Patent
Coulmeau

(10) Patent No.: US 7,584,073 B2
(45) Date of Patent: Sep. 1, 2009

(54) METHOD FOR CHECKING THE APPROPRIATENESS OF A MASS VALUE OF AN AIRCRAFT

(75) Inventor: François Coulmeau, Seilh (FR)

(73) Assignee: Thales (FR)

( * ) Notice: Subject to any disclaimer, the term of this patent is extended or adjusted under 35 U.S.C. 154(b) by 56 days.

(21) Appl. No.: 11/854,477

(22) Filed: Sep. 12, 2007

(65) Prior Publication Data

US 2008/0065352 A1    Mar. 13, 2008

(30) Foreign Application Priority Data

Sep. 12, 2006    (FR) .................................. 06 07962

(51) Int. Cl.
*G01G 19/07* (2006.01)
*G06F 17/40* (2006.01)

(52) U.S. Cl. ........................ 702/173; 702/50; 702/55; 701/104

(58) Field of Classification Search ................ 702/173, 702/50, 55

See application file for complete search history.

(56) References Cited

U.S. PATENT DOCUMENTS

| 4,110,605 A | 8/1978 | Miller | |
| 4,490,802 A | 12/1984 | Miller | |
| 6,256,679 B1 * | 7/2001 | Rhoads et al. | 719/315 |
| 6,782,346 B2 * | 8/2004 | Bond et al. | 702/183 |
| 2008/0065449 A1 * | 3/2008 | Blagg et al. | 705/8 |

FOREIGN PATENT DOCUMENTS

| DE | 10056923 | 5/2002 |
| WO | 0238444 | 5/2002 |

\* cited by examiner

*Primary Examiner*—Hal D Wachsman
(74) *Attorney, Agent, or Firm*—Lowe Hauptman Ham & Berner, LLP

(57) ABSTRACT

A method for checking the appropriateness of an aircraft ground mass value $M_s$, communicated to a flight management system of the aircraft by a crew member of the aircraft or by an airline operating the aircraft, the communication taking place before a takeoff of the aircraft from a departure airport to a destination airport. The method includes two checking phases. A first direct appropriateness check, based on a cross-check of independent information related to the mass of the aircraft. A second indirect appropriateness check based on a comparison between values of performance parameters calculated on the basis of the mass value of the aircraft $M_s$ and of the values of the same performance parameters provided by a manufacturer of the aircraft.

21 Claims, 3 Drawing Sheets

METHOD FOR CHECKING THE APPROPRIATENESS OF A MASS VALUE OF AN AIRCRAFT

RELATED APPLICATIONS

The present application is based on, and claims priority from, France Application Number 0607962, filed Sep. 12, 2006, the disclosure of which is hereby incorporated by reference herein in its entirety.

1. Technical Field

The field of the invention is that of checking the appropriateness of a mass value of an aircraft.

2. Background of the Invention

The mass of an aircraft is a parameter whose value influences the behavior of the aircraft in flight, from takeoff to landing. It is very important for an aircraft pilot to track during a flight, the value of the mass of his aircraft: this tracking is carried out based on a knowledge of the mass of the aircraft at takeoff. The value of the mass of the aircraft at takeoff can be input manually by the crew of the aircraft or else transmitted aboard the aircraft, by means of digital links, by the airline operating the aircraft. Because of the importance of the influence that the mass of the aircraft has on the behavior of the aircraft, notably during the takeoff phase, it is very important for the pilot to check the appropriateness of the mass value of his aircraft, on the ground, before takeoff. This check can make it possible to discern an error in inputting or in transmitting the value of the mass aboard the aircraft.

The growth in automation in both civil and military avionics is increasingly leading the crew of aircraft to perform electronic systems control tasks and less and less to directly influence the aircraft's primary piloting controls. This tendency has been accentuated in recent years with the generalization of onboard flight management systems such as for example the FMS (the acronym standing for "Flight Management System"). These systems concentrate a great deal of data: these data originate notably from sensors, navigation databases and performance databases. The data are employed during navigation, to formulate a digital flight plan, and in the course of tracking the flight plan, to formulate predictions. Other data are input manually by the crew or else are transmitted via a digital link by the airline which operates the craft. These other data are employed, in general, to initialize calculations before the aircraft takes off but are often the cause of errors. These errors may be due to unsuitable ergonomics of the data communication devices (small size keyboards, parallax errors) or to human errors (fatigue of the crew, dyslexia, units, or else ignorance of the orders of magnitude of the values taken by these parameters).

The great majority of aircraft, both civil and military, are not equipped with an aircraft auto-weighing system. The aircraft ground mass is a data item input by the pilot before takeoff, input of which is frequently erroneous, thereby entailing errors that may have serious consequences for the piloting of the craft.

Specifically, the mass of the aircraft at takeoff is one of the data items which makes it possible to evaluate the takeoff ground speed parameters that are indispensable to the crew during a takeoff phase, such as for example the stopping speed (V1), the rotation speed (VR), or the speed allowing obstacle avoidance in the event of engine failure (V2).

For example, when by error the aircraft ground mass which is input is equal to 250 tons while the mass of the aircraft equals 350 tons in reality, this error leads the pilot to underestimate the speed to be imparted to his aircraft or else to overestimate the incidence of the aircraft at takeoff. This error can therefore cause two aircraft accidents of a different kind: takeoff impossible at the end of the runway or aircraft stall.

Additionally, the mass of the aircraft is also indispensable for evaluating another performance parameter: the approach speed (Vapp). Vapp is the speed that the pilot must assign to his craft during an approach phase, the approach phase preceding the landing of the aircraft. Now, the mass of the aircraft at the start of the approach phase depends on the aircraft ground mass and the fuel consumption, from aircraft takeoff to the approach phase.

Because of the seriousness of the consequences of an error by the crew in inputting the aircraft ground mass, control procedures have been put in place by aeronautical constructors and airlines to reduce the frequency of these errors. These control procedures consist for example of a cross-check of the data input by the members of the crew: the data input by the pilot being for example checked by the co-pilot.

However, undetected errors persist despite the control procedures, this is due to a strong influence of the human factor, or else to poor transmission of data by digital data link between the company and the craft. These errors have been the cause of serious problems on aircraft in recent years.

SUMMARY OF THE INVENTION

The aim of the invention is to alleviate these drawbacks. More precisely, it is intended on the one hand to estimate the mass of the airplane at takeoff by means independent of the FMS with a view to checking, by an information cross-check, the appropriateness of the input aircraft ground mass value $M_s$ and on the other hand to compare values of performance parameters that the aircraft ground mass value $M_s$ makes it possible to calculate with performance parameter values consigned in a constructor database.

More precisely the subject of the invention is a method for checking the appropriateness of an aircraft ground mass value $M_s$, communicated to a flight management system of the aircraft by a crew member of the aircraft or by an airline operating the aircraft, the communication taking place before a takeoff of the aircraft to perform a journey connecting a departure airport to a destination airport, wherein it comprises one of the following two check phases:

a direct appropriateness check, based on a cross-check of independent information related to the mass of the aircraft;

an indirect appropriateness check, based on a comparison between values of performance parameters calculated on the basis of the mass value of the aircraft $M_s$ and of the values of the same performance parameters provided by a constructor of the aircraft.

This invention makes it possible to check the appropriateness of the aircraft ground mass value before takeoff by several procedures which are mutually independent.

The direct appropriateness check phase can be implemented very simply, it entails determining initially the mass of the aircraft with no fuel to which is added the mass of the fuel onboard the aircraft which can be, likewise, estimated in two independent ways, one of which requires a performance database, BDF provided by the constructor of the aircraft and the other of which does not.

Additionally, the indirect appropriateness check phase can be implemented by virtue of data contained in the performance database, BDF.

Thus, depending on whether or not the aircraft is equipped with the performance database BDF, one or three independent procedures are available for checking the appropriateness of the aircraft takeoff mass information.

In the situation where the aircraft is equipped with the performance database BDF, it is thus possible to determine and allocate a confidence index to a mass value Ms input at takeoff as a function of the number of inconsistencies discerned between the input mass value of the aircraft Ms by the check procedures of the method according to the invention. The confidence index can thus comprise 4 levels scored for example between 0, 1, 2, 3. For example, 0 indicates that the value Ms does not appear to be appropriate according to any of the check procedures implemented and conversely 3 indicating that the three check procedures implemented agree in estimating the value of Ms appropriate.

Still other objects and advantages of the present invention will become readily apparent to those skilled in the art from the following detailed description, wherein the preferred embodiments of the invention are shown and described, simply by way of illustration of the best mode contemplated of carrying out the invention. Accordingly, the drawings and description thereof are to be regarded as illustrative in nature, and not as restrictive.

BRIEF DESCRIPTION OF THE DRAWINGS

Other characteristics and advantages of the invention will appear on reading the detailed description which follows, made by way of nonlimiting example and with reference to the appended drawings in which.

Across the figures, the same elements are labeled by the same references.

DETAILED DESCRIPTION OF THE INVENTION

Figure 1:
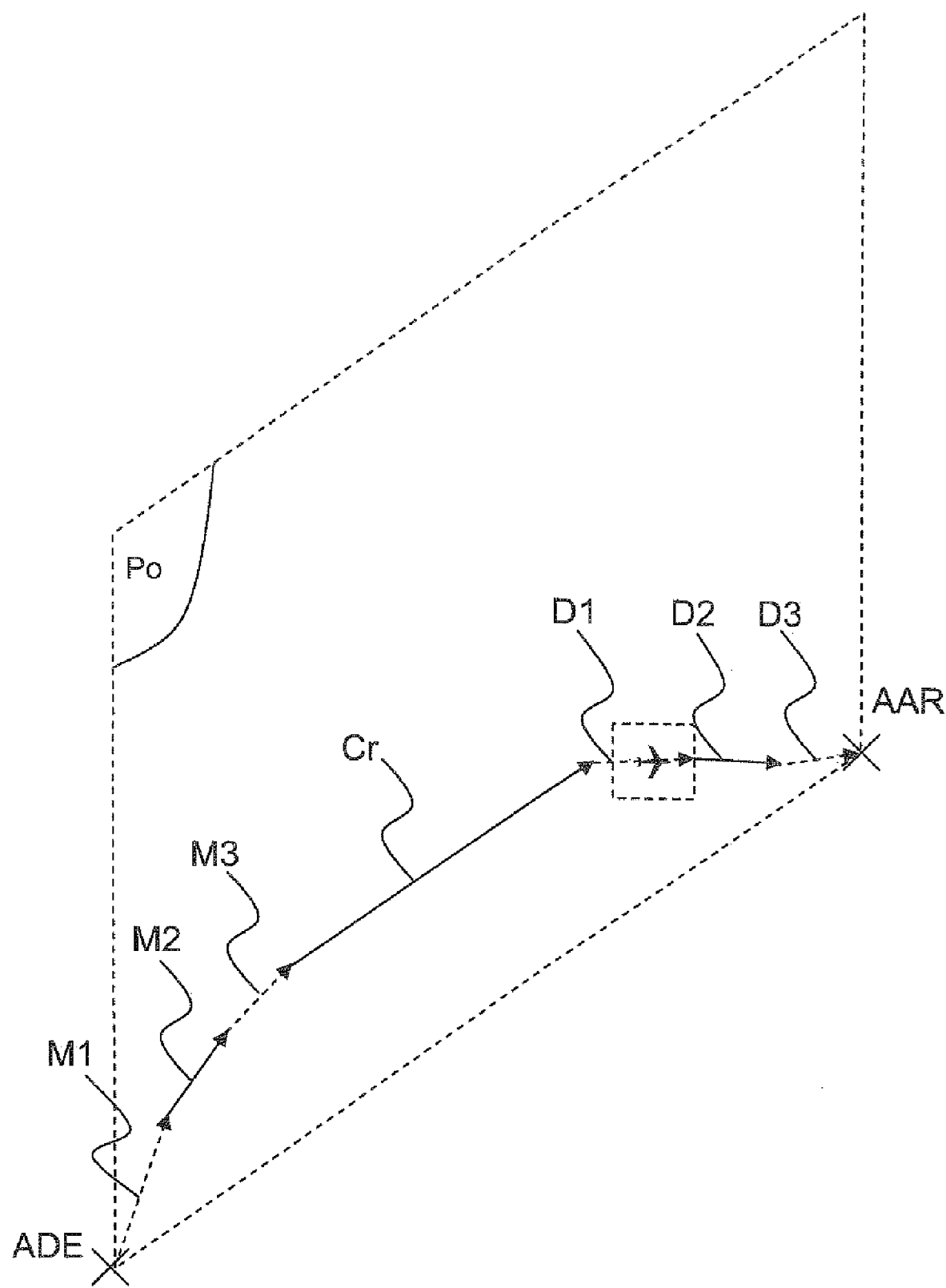
FIG. 1 schematically represents a simplified profile connecting the departure airport to the destination airport, according to the invention.

Before taking off, an aircraft pilot must determine values taken by a certain number of performance parameters regarding his aircraft. The performance parameters in question are speed parameters critical to takeoff such as the runway takeoff stopping speed, V1, the rotation speed, VR, the setpoint speed at takeoff for managing obstacles in the event of engine failure, V2 or else speed parameters critical to landing such as the approach speed for landing Vapp. By determining a value of V1, the pilot calculates an aircraft speed onwards of which the pilot can no longer stop his craft and is compelled to take off. By determining a value of VR, the pilot calculates a minimum speed onwards of which his aircraft can take off. By determining a value of V2, the pilot calculates a speed that the aircraft must reach after takeoff. By determining a value of Vapp, the pilot calculates a minimum speed onwards of which his aircraft can take off. The value taken by these performance parameters allow the aircraft pilot to formulate and to optimize the takeoff and then the landing of his craft.

To calculate the value of these performance parameters, the pilot must firstly ascertain the mass of his aircraft.

In the prior art, a value of the mass of the aircraft at takeoff Ms is determined by the airline which operates the aircraft. In general, the value Ms is communicated to the flight management system (FMS) by manual input by the pilot, the pilot having had communication to do so through a radio voice message, but it can also be communicated to the FMS, directly through a digital data link or by radio by the airline.

However, situations occur in which the communication to the FMS of the mass of the aircraft at takeoff Ms by the pilot or by the company is erroneous. This communication error may be caused by an input error resulting from unsuitable keyboard ergonomics, or may be related to the pressure to which an aircraft pilot is subjected in the moments prior to takeoff.

Whatever its cause, an error in the mass of the aircraft at takeoff Ms can have serious consequences for passengers of the aircraft. It is important for the safety of the flight that before takeoff, the pilot can be sure of the appropriateness of the value of the mass of the aircraft at takeoff Ms which is communicated to the FMS, and that the value of critical ground speeds calculated by the FMS are based on an assumption supported by independent means.

A direct check or an indirect check of the value of Ms communicated to the FMS may be made independently.

Advantageously, the direct appropriateness check comprises steps consisting in:
  determining an aircraft ground mass, with no fuel, MHC;
  performing a first estimation of a mass of fuel carried onboard the aircraft, EMC1;
  performing a second estimation of a mass of fuel carried onboard the aircraft EMC2;
  comparing the mass value $M_s$ and the value, ME1, consisting of a sum of the aircraft ground mass with no fuel, MHC and of the first estimation of onboard fuel mass, EMC1;
  comparing the mass value $M_s$ and the value, ME2, consisting of a sum of the aircraft ground mass with no fuel, MHC and of the second estimation of onboard fuel mass, EMC2;
  when the absolute value of the difference M1 between Ms and ME1 is greater than a threshold value S1, or when the absolute value of the difference M2 between Ms and ME2 is greater than a threshold value S2, triggering an alert destined for the crew.

Advantageously, the step of determining the aircraft ground mass with no fuel, MHC, comprises steps consisting in:
  determining a type of the aircraft;
  determining a configuration of the aircraft, the aircraft being able to have a "cargo" configuration or else a "passenger transport" configuration;
  when the aircraft has the "cargo" configuration, determining an aircraft onboard freight mass, MFR;
  when the aircraft has the "passenger transport" configuration, determining a number of passengers onboard the aircraft, NPA;

"Type" of the aircraft should be understood to mean a set of information about the aircraft comprising an aircraft model number for example A319-100, B737-800, A340-300, a motorization reference, for example CFM565C2, PW4164, and, a serial number of the aircraft. This information set, which also includes a value of total thrust of the motorization and which is expressed in Newtons, is advised by the constructor of the aircraft and is stored inside registers of the FMS ("pinprogs") which are accessible.

On the basis of the type of the aircraft, it is possible to access constructor parameters which are arrayed in a database formulated by the constructor of the aircraft and indexed by aircraft type. The constructor parameters include a value of the mass of the aircraft when empty MWE, a value of operational mass of the aircraft when empty OWE, a dry operational mass DOW, a maximum number of seats, NMS that the aircraft can comprise when it is in the "passenger transport" configuration and a unit mass of a passenger seat Ms.

The operational mass of the aircraft when empty OWE, is a sum of the mass of the aircraft when empty MWE, the mass of the members of a nominal crew of the aircraft, the mass of the luggage of the crew members, the mass of a cabin structure which includes crew seats, the unusable fuel mass, the mass of the engine oil, the mass of the fluid used for the toilets, the mass of the food provisions for the maximum number of passengers, and finally the mass of the aircraft documentation.

The dry operational mass DOW, is equal to the operational mass of the aircraft when empty OWE from which is deducted the mass of the food provisions for the maximum number of passengers of the aircraft.

A number of passengers onboard the aircraft for the flight is communicated to the FMS by the airline. This number of passengers is stored in a register of the FMS named PAX ("Passenger Count"). This register is for example accessible on a page named INIT of the FMS and it makes it possible furthermore to determine a configuration of the aircraft.

When the field PAX contains a value equal to zero, it is determined that the aircraft is in the "cargo" configuration. When the field PAX contains a value strictly greater than zero, it is determined that the aircraft is "passenger transport" configuration.

An aircraft onboard freight mass, MFR, when the aircraft is in the "cargo" configuration, is also communicated to the FMS by the airline. This value, MFR is stored in a register of the FMS.

When the type and the configuration of the aircraft are known, it is possible to determine simply the mass of the aircraft with no fuel MHC with the aid of parameters whose value depends exclusively on the type and configuration of the aircraft.

Thus, when an aircraft is in the "passenger transport" configuration, a standard mass is defined for a passenger and his luggage Mp, for example Mp equals 115 kilograms and corresponds to a mass of a passenger equal to 75 kilograms and to a mass of luggage per passenger equal to 40 kilograms. The mass when empty of the aircraft, MHC is expressed in the form of the following formula:

$$MHC=OWE+PAX*Mp$$

When an aircraft is in the "cargo" configuration, the mass when empty of the aircraft, MHC is expressed in the form of the following formula:

$$MHC=DOW+MFR-NMS*Ms$$

The direct check additionally requires that at least one estimation be made of the mass of fuel carried onboard the aircraft EMC1, EMC2.

Advantageously, the first estimation of a mass of fuel carried onboard the aircraft, EMC1, consists in evaluating a mass of fuel present aboard the aircraft by means of a fuel probe and a computer with which the aircraft is equipped.

The aircraft is in general equipped with at least one fuel probe delivering at any instant an item of information about a volume of fuel present in the aircraft. This fuel volume information can be expressed in the form of aircraft onboard fuel mass information, as long as a density of the fuel is known.

The fuel probe, which is a critical item of equipment of the aircraft, only very rarely delivers erroneous information about the fuel volume onboard the aircraft. The information about the onboard fuel volume that the probe delivers is available in registers of the FMS bearing, for example, the name FQI (Fuel Quantity Instrument) or FCMC (Fuel Control and Monitoring Computer).

There exists a second procedure for estimating mass of fuel carried onboard the aircraft which is different and independent of the first procedure described above.

Advantageously, the second estimation of a mass of fuel carried onboard the aircraft, EMC2, consists in evaluating a mass of fuel to be taken on board which allows the aircraft to make the journey separating a departure airport from a destination airport.

Advantageously, the second estimation comprises steps consisting in:
  extracting from the flight management system, FMS, of the aircraft:
    the departure airport, ADE;
    the destination airport, AAR;
    a possible alternative airport AD;
    a cruising altitude;
    a cost index.
  iteratively estimating a fuel mass at takeoff, termed the nominal mass Mno, so that the aircraft should travel a first simplified profile, connecting the departure airport to the destination airport, the fuel consumption of the aircraft being minimized;
  when an alternative airport is extracted, iteratively estimating a fuel mass at takeoff, termed the backup mass, Mse, so that the aircraft should travel a second simplified profile, connecting the departure airport to the alternative airport, the fuel consumption of the aircraft being minimized;
  estimating the fuel mass, EMC2, as being equal to a maximum between the nominal mass value, Mno, and the backup mass value, Mse.

The cost index is an optimization criterion which weights the flight duration and the fuel consumption: a cost index having a not very high value corresponds to an inexpensive flight and to a not very high flight speed. On the other hand, a cost index with an economic high value corresponds to a high travel speed and therefore to a large fuel consumption.

FIG. 1 represents a simplified profile according to the invention for performing a second estimation of the mass of fuel carried onboard the aircraft.

Advantageously, the simplified profile is defined laterally by an orthodromy between a departure airport and an arrival airport and that the simplified profile is defined vertically by:
  a first climb M1, from the departure airport, from the ground up to a first altitude, performed at the speed V2, with a maximum thrust;
  In the takeoff phase which can last a few tens of seconds, one does not seek to optimize the fuel consumption, one rathermore seeks to make the craft climb as rapidly as possible to decrease the noise nuisance.
  a second climb M2, from the first altitude up to a speed limit altitude, performed at a first speed and a thrust identical to that adopted during the first climb;
  a third climb, M3, from the speed limit altitude up to the cruising altitude, performed at a second speed and a thrust identical to that adopted during the first climb;
  a cruising, Cr, at the cruising altitude, performed at a third speed with a thrust adapted for maintaining the third speed constant;
  a first descent, D1, from the cruising altitude down to a second altitude, performed at a fourth speed, with an idle thrust;
  a second descent, D2, from the second altitude down to a third altitude, performed at a fifth speed, and a thrust adapted for maintaining the fifth speed constant;

a third descent, D3, to the arrival airport, from the second altitude down to the ground, under constant deceleration from the fifth speed to the approach speed Vapp;

Thus the orthodromy which laterally defines the simplified profile is, in accordance with the representation of FIG. 1, a vertical plane P0 passing through two points situated on the terrestrial globe, that is to say a plane passing through the center of the earth, the departure point and the arrival point.

Advantageously, the maximum thrust corresponds to 80% of the total thrust.

Advantageously, the idle thrust corresponds to 20% of the total thrust.

Advantageously, the estimation of the fuel mass, EMC2 takes into account, furthermore, a fuel reserve to forewarn of the vagaries arising during the journey separating the departure airport from the destination airport.

Advantageously, the fuel mass estimation, EMC2 takes into account, furthermore, a fuel reserve to forewarn of a standby during the approach to the destination airport.

In order to estimate the fuel mass actually on board, it is possible to augment the estimation of fuel quantity EMC2 consumed to perform a simplified journey between two airports by a reserve fuel quantity to take account of codified vagaries ("formfits"). For example the fuel mass estimation EMC2 determined by the iterative calculation can be augmented by 5% so as to cover route vagaries.

Additionally, it is also possible to add to the fuel mass estimation EMC2 determined by the iterative calculation a quantity of fuel corresponding to 30 flight minutes in a cruising situation in accordance with the simplified profile followed, to cover the aircraft standby, on the approach to the destination airport. This fuel reserve corresponds to a situation in which the aircraft traverses an aerodrome-like trajectory for the maximum standby duration.

The estimation of the mass of the aircraft EMC2 takes into account a vagary relating to a modification of the journey during flight: for example substituting an alternative airport for the destination airport by considering EMC2 as being equal to the maximum of the fuel consumption on the simplified profile connecting on the one hand the departure airport to the destination airport and of the fuel consumption on the simplified profile connecting on the one hand the departure airport to the alternative airport.

The whole set of aircraft consumption calculations conducted in order to perform the fuel mass estimation EMC2 can be performed by means of extractions and interpolations of data stored in a performance database, BDF.

The performance database BDF contains for example, for a given flight altitude, a given flight speed, a wind and temperature model data making it possible to determine a consumption of an aircraft whose type is known, over a given distance, and along a given direction.

An estimation of the mass of the aircraft with no fuel, MHC, and two estimations of the mass of fuel carried onboard the aircraft EMC1, EMC2 are therefore available to the flight management system of the aircraft on completing the calculations that it has conducted for checking direct appropriateness. It can compare the aircraft ground mass value Ms input before takeoff with respectively, the value, ME1, consisting of a sum of the aircraft ground mass with no fuel, MHC and of the first estimation of onboard fuel mass, EMC1 and with the value, ME2, consisting of a sum of the aircraft ground mass with no fuel, MHC and of the second estimation of onboard fuel mass, EMC2;

Advantageously, the threshold S1 has a value of less than 0.05 EMC1.

Advantageously, the threshold S2 has a value of less than 0.15 EMC2.

When the absolute value M1 of the difference between Ms and ME1 is greater than a threshold value S1, or when the absolute value M2 of the difference between Ms and ME2 is greater than a threshold value S2, an alert is addressed to the crew of the aircraft.

The indirect check of the appropriateness of the ground mass value Ms is based on an examination of consistency between first values of performance parameters PPF calculated on the basis of the mass value Ms with second values of the same performance parameters PPF originating from the performance parameters database BDF.

It was stated above, an estimation of parameter performance value such as V1, VR, V2, Vapp of an aircraft is notably dependent on an estimation of the aircraft ground mass. For these performance parameters, it is therefore possible to estimate a first suite J1 of first values by considering the mass of the aircraft to be equal to the value Ms. In practice, the first suite of performance parameters PPF is entered by the pilot (in the majority of cases), inducing a risk of error at the time of input, or calculated by the system on the basis of the mass Ms entered by the pilot on the basis of tables that are very simplified (because of the unwieldiness of the calculations).

The performance database BDF contains values taken by certain performance parameters PPF. These values are arrayed as a function of entry values of the database. Thus, by fixing entry values of the database BDF so that they correspond to the aircraft, it is possible to extract a second suite J2 of second values of the performance parameters PPF. The estimations J2 call upon performance tables PFF provided by the constructor in paper form and digitized and are calculated on the basis of a mass estimation performed during the previous steps.

The indirect check has the advantage of detecting possible errors related to the manual input of the values J1 or to the approximate calculations of J1.

When the values of the entries of the database BDF do not exactly correspond to the situation of the aircraft before takeoff, the second values can be obtained by interpolating values contained in the database BDF.

Advantageously, the flight management system of the aircraft comprising a performance parameters database BDF that is formulated by the constructor of the aircraft and comprising values of performance parameters PPF, wherein the indirect check comprises steps consisting in:

calculating a first suite, J1 of first values of the performance parameters PPF by considering the mass of the aircraft to be equal to the value Ms;

extracting from the performance parameters database BDF a second suite, J2, of second values of performance parameters PPF corresponding to a configuration of the aircraft;

comparing the first suite J1 and the second suite J2 of values of performance parameters PPF of the aircraft;

when the absolute value of one of the differences between a first value of J1 and a second value of J2 of one and the same performance parameter PPF is greater than a threshold value S3, triggering an alert destined for the crew.

Advantageously, a slat-flap configuration of the aircraft forms part of the entries of the performance parameters database BDF.

Advantageously, an aircraft takeoff runway altitude forms part of the entries of the performance parameters database BDF.

Advantageously, an aircraft takeoff runway length forms part of the entries of the performance parameters database BDF.

Advantageously, an aircraft takeoff runway temperature forms part of the entries of the performance parameters database BDF.

Advantageously, a runway takeoff stopping speed, V1, forms part of the performance parameters PPF.

Advantageously, a rotation speed, VR is one of the performance parameters PPF.

Advantageously, a setpoint speed at takeoff for managing obstacles in the event of engine failure, V2, forms part of the performance parameters PPF.

Advantageously, an approach speed for landing Vapp, forms part of the performance parameters PPF.

Advantageously, the threshold S3 has a value of less than 15 knots.

Figure 2:
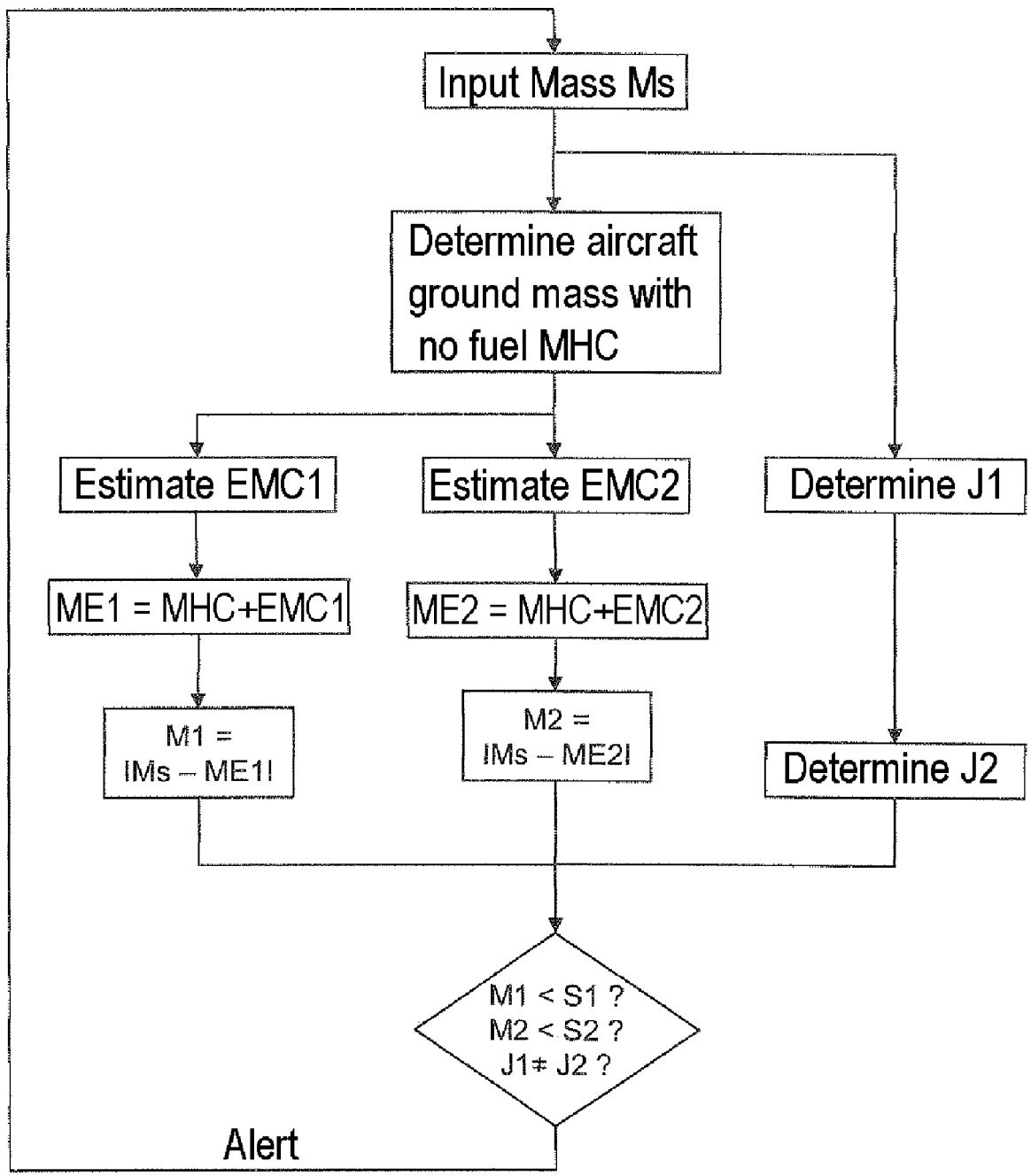
FIG. 2 schematically represents the method for checking the appropriateness of an aircraft ground mass value according to the invention.
Figure 3:
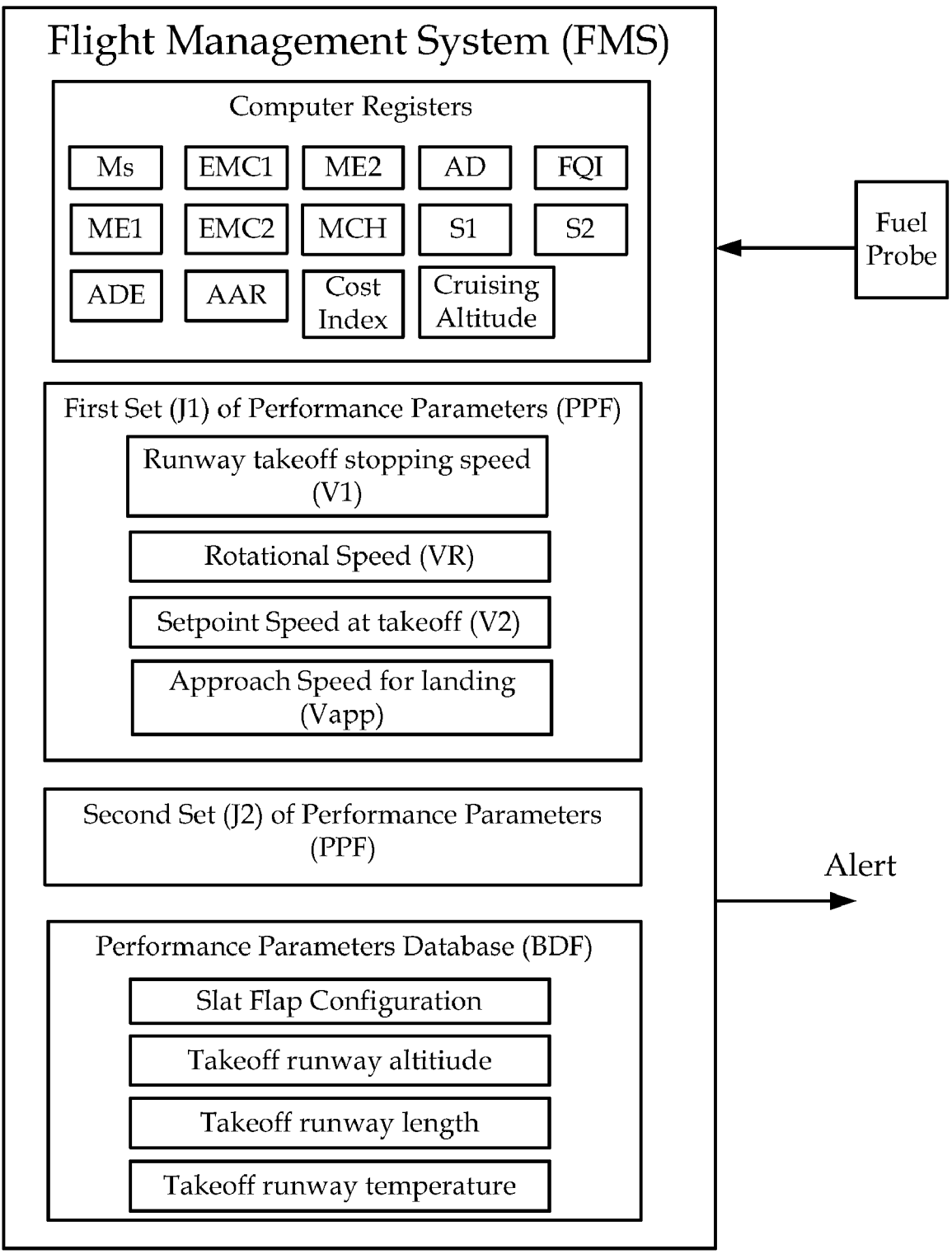
FIG. 3 schematically represents an embodiment of a system for validating an aircraft ground mass value.

FIG. 2 represents a flowchart of the method according to the invention.

The flowchart breaks down into three phases which can be followed independently of one another. All three phases comprise a first step and a last step which are mutually identical:

The first step consists in inputting an aircraft ground mass value Ms, before a takeoff. The inputting can for example be performed by a crew member.

The last step comprises a comparison of parameter values estimated by two independent means prolonged, when the comparison reveals a difference between the parameter values, by an alert triggering destined for the crew of the aircraft, The phase drawn on the right in the figure represents the indirect appropriateness check explained previously. This phase comprises two steps:
  a first estimation of a first suite J1 of first values of performance parameters PPF of the aircraft by considering the mass of the aircraft to be equal to the value Ms;
  an extraction, from the performance parameters database BDF of a second suite J2 of second values of performance parameters PPF of the aircraft corresponding to a chosen configuration of the aircraft.

The other two phases, drawn on the left and in the center in FIG. 2, represent the two direct appropriateness checks. These two direct appropriateness checks comprise a second identical step consisting in determining the aircraft mass with no fuel, MHC.

The two direct appropriateness checks comprise a third different step for estimating mass of fuel carried onboard the aircraft EMC1, EMC2.

The phase drawn on the left in FIG. 2 comprises a first estimation of a mass of fuel carried onboard the aircraft, EMC1. It comprises steps which consist in:
  determining a type of the aircraft;
  determining a configuration of the aircraft, the aircraft being able to have a "cargo" configuration or else a "passenger transport" configuration;
  when the aircraft has the "cargo" configuration, determining an aircraft onboard freight mass, MFR;
  when the aircraft has the "passenger transport" configuration, determining a number of passengers onboard the aircraft, NPA;

The phase drawn in the center in FIG. 2 comprises a second estimation of a mass of fuel carried onboard the aircraft, EMC2 which consists in evaluating a mass of fuel to be taken on board which allows the aircraft to make the journey separating the departure airport from the destination airport.

When several phases of the method according to the invention are followed in parallel, it is possible to determine a number of phases for which the comparison reveals a difference between identical parameter values which are estimated by independent procedures and then to allocate a confidence index to the mass value Ms which is input at takeoff as a function of the number of inconsistencies discerned between the estimated parameter values.

The maximum confidence index can for example be equal to three when the three phases are followed and when no difference between the value of the parameters is discerned. The minimum confidence index, for example can be equal to 0, corresponds, still when the three phases are followed to the situation where three differences between the value of the parameters are discerned.

An alert is triggered destined for the crew of the aircraft as soon as one of the phase highlights a difference between the values of the estimated parameters.

The confidence index can be transmitted to the crew members simultaneously with the alert.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of validating a predetermined aircraft ground mass value $M_s$ of an aircraft prior to takeoff from a departure airport to a destination airport, comprising:
  performing a direct check of value $M_s$, comprising the steps of:
  determining a first estimation (EMC1) of a mass of fuel carried onboard the aircraft, by means of a fuel probe and computer; and
  determining a second estimation (EMC2) of the mass of fuel carried onboard the aircraft by evaluating a mass of fuel required to fly the aircraft from the departure airport to the destination airport; and
  performing an indirect check of value $M_s$, based on a comparison between values of performance parameters calculated on the basis of the mass value of the aircraft and of the values of the same performance parameters provided by a manufacturer of the aircraft; and
  triggering an alert based upon results of the direct check and the indirect check.

2. The method as claimed in claim 1 wherein the direct check of mass value $M_s$ further comprising:
  determining an aircraft ground mass with no fuel;
  comparing the mass value $M_s$ and a first value, determined from a sum of the aircraft ground mass with no fuel and of the first estimation of onboard fuel mass, EMC1;
  comparing the mass value $M_s$ and a second value, determined from a sum of the aircraft ground mass with no fuel, and of the second estimation of onboard fuel mass, EMC2;
  when the absolute value of the difference between the mass value $M_s$ and the first value is greater than a first threshold value, or when the absolute value of the difference between the mass value $M_s$ and the second value is greater than a second threshold value, triggering an alert destined for the crew.

3. The method as claimed in claim 2 wherein the step of determining the aircraft ground mass with no fuel, comprises:
  determining a type of the aircraft;
  determining a configuration of the aircraft, the aircraft being able to have a cargo configuration or else a passenger transport configuration;

when the aircraft has the cargo configuration, determining an aircraft onboard freight mass;

when the aircraft has the passenger transport configuration, determining a number of passengers onboard the aircraft.

4. The method as claimed in claim 2, wherein the second estimation comprises:

extracting from the flight management system of the aircraft:
 the departure airport;
 the destination airport;
 a possible alternative airport;
 a cruising altitude;
 a cost index;

iteratively estimating a fuel mass at takeoff, i.e., the nominal mass, so that the aircraft should travel a first simplified profile, connecting the departure airport to the destination airport, the fuel consumption of the aircraft being minimized;

when an alternative airport is extracted from the flight management system iteratively estimating a fuel mass at takeoff, i.e., the backup mass, so that the aircraft should travel a second simplified profile, connecting the departure airport to the alternative airport, the fuel consumption of the aircraft being minimized;

estimating the fuel mass, EMC2 as being equal to a maximum between the nominal mass value and the backup mass value.

5. The method as claimed in claim 4, wherein a simplified profile is defined laterally by an orthodromy between a departure airport and an arrival airport and wherein a simplified profile is defined vertically by:

a first climb from the departure airport, from the ground up to a first altitude, performed at a speed, with a maximum thrust;

a second climb from the first altitude up to a speed limit altitude, performed at a first speed and a thrust identical to that adopted during the first climb;

a third climb from the speed limit altitude up to the cruising altitude, performed at a second speed and a thrust identical to that adopted during the first climb;

a cruising at the cruising altitude, performed at a third speed with a thrust adapted for maintaining the third speed constant;

a first descent from the cruising altitude down to a second altitude, performed at a fourth speed, with an idle thrust;

a second descent from the second altitude down to a third altitude, performed at a fifth speed, and a thrust adapted for maintaining the fifth speed constant;

a third descent to the arrival airport, from the second altitude down to the ground, under constant deceleration of the fifth.

6. The method as claimed in claim 5, wherein the maximum thrust corresponds to 80% of the total thrust.

7. The method as claimed in claim 5, wherein the idle thrust corresponds to 20% of the total thrust.

8. The method as claimed in claim 4, wherein the estimation of the fuel mass, EMC2 includes a fuel reserve.

9. The method as claimed in claim 4, wherein the fuel mass estimation, EMC2 includes a fuel reserve.

10. The method as claimed in claim 2, wherein the first threshold has a value of less than 0.05 EMC1.

11. The method as claimed in claim 2, wherein the second threshold has a value of less than 0.15 EMC2.

12. The method as claimed in claim 1, wherein the flight management system of the aircraft comprises a performance parameters database formulated by the manufacturer of the aircraft, wherein performing an indirect check comprises:

calculating a first suite of first values of performance parameters of the aircraft by considering the mass of the aircraft to be equal to the mass value $M_s$;

extracting from the performance parameters database a second suite of second values of performance parameters of the aircraft corresponding to a configuration of the aircraft;

comparing the first suite and the second suite of values of performance parameters of the aircraft;

when the absolute value of one of the differences between a first value of the first suite and a second value of the second suite of one and the same performance parameter is greater than a threshold value, triggering an alert.

13. The method as claimed in claim 12, wherein a slat-flap configuration of the aircraft forms part of the entries of the performance parameters database.

14. The method as claimed in claim 12, wherein an aircraft takeoff runway altitude forms part of the entries of the performance parameters database.

15. The method as claimed in claim 12, wherein an aircraft takeoff runway length forms part of the entries of the performance parameters database.

16. The method as claimed in claim 12, wherein an aircraft takeoff runway temperature forms part of the entries of the performance parameters database.

17. The method as claimed in claim 12, wherein a runway takeoff stopping speed forms part of the performance parameters.

18. The method as claimed in claim 12, wherein a rotation speed is one of the performance parameters.

19. The method as claimed in claim 12, wherein a setpoint speed at takeoff for managing obstacles in the event of engine failure forms part of the performance parameters.

20. The method as claimed in claim 12, wherein an approach speed for landing forms part of the performance parameters.

21. The method as claimed in claim 12, wherein the threshold has a value of less than 15 knots.

* * * * *